3,081,228
ANDROSTANO[2.3-d]-2'-AMINOTHIAZOLES

Raymond O. Clinton, East Greenbush, N.Y., assignor to Sterling Drug Inc., New York, N.Y., a corporation of Delaware
No Drawing. Filed Dec. 4, 1958, Ser. No. 778,070
7 Claims. (Cl. 167—65)

This invention relates to androstano[2.3-d]-2'-aminothiazoles, esters and salts thereof, and to a process for the preparation thereof.

The compounds of the invention are steroids of the androstane series having the structural formula

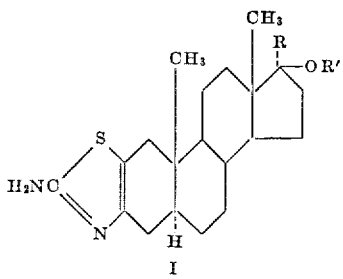

I wherein R represents hydrogen or a lower-alkyl radical, and R' represents hydrogen or a carboxylic acyl radical.

When R in the above general Formula I represents a lower-alkyl radical, it stands for an alkyl radical having from one to about four carbon atoms, and thus includes such groups as methyl, ethyl, propyl, isopropyl, butyl, isobutyl and tertiarybutyl.

When R' in the above general Formula I represents a carboxylic acyl radical, it stands for an acyl radical preferably derived from carboxylic acids having from one to about ten carbon atoms, and having a molecular weight less than about 250. Representative of the acyl radicals which can be present are lower-alkanoyl radicals, e.g., formyl, acetyl, propionyl, butryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl, p-toluyl, p-nitrobenzoyl, 3,4,5 - trimethoxybenzoyl, and the like; monocarbocyclic aryl-lower-alkanoyl or -alkenoyl radicals, such as phenylacetyl, β-phenylpropionyl, cinnamoyl, and the like; and monocarbocyclic aryloxy-lower-alkanoyl radicals, such as p-chlorophenoxyacetyl, and the like.

The compounds of the present invention are prepared by reacting thioure with a compound having the formula

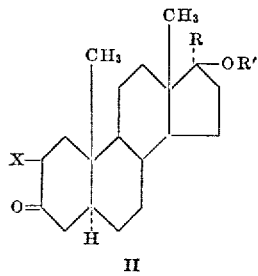

II wherein R and R' have the same meanings as given above, and X represents halogen selected from chlorine, bromine and iodine.

The reaction between thiourea and a halo steroid of Formula II takes place readily under a wide variety of conditions, preferably in an inert solvent at a temperature between about 50° C. and 150° C. Lower-alkanols and -alkanones are particularly useful inert solvents.

The intermediate halo steroids of Formula II are prepared by halogenation of the corresponding 3-oxo steroids unsubstituted in the 2-position. Halogenation is effected by direct reaction wtih the elementary halogen or by modifications thereof such as those described in U.S. Patents 2,311,638, 2,678,932 and 2,681,353.

If compounds wherein R' in Formula I represents an acyl group are desired, it is preferred to have the acyl group present in the molecule (Formula II) prior to the reaction with thiourea, because direct esterification of compounds of Formula I is likely to cause side-reactions such as acylation of the free amino group in the 2-position of the thiazole ring.

The compounds of Formula II wherein R' represents hydrogen can be esterified by heating the steroid alcohol with the appropriate acid anhydride or acid halide in the presence of pyridine.

The compounds of the invention are basic in character, and react with strong acids to form acid-addition salts. These acid-addition salts are also within the purview of the invention. Preferred types of salts are those derived from pharmacologically acceptable strong inorganic or organic acids, such as hydrochloric acid, hydrobromic acid, hydriodic acid, sulfuric acid, phosphoric acid, ethanesulfonic acid, p-toluenesulfonic acid, and the like, although salts containing toxic anions are also useful in the characterization of the free bases, and as intermediates in the purification of the free bases which are readily regenerated by treating the salt with alkali; or as intermediates in the preparation of non-toxic salts by ion exchange reactions as by passage through an ion exchange resin.

The structure of the compounds of the invention was established by the mode of synthesis, the ultraviolet and infrared spectra, and by the fact that the values found upon elementary analysis corresponded with the values calculated for the assigned structures.

The following examples will further illustrate the invention without the latter being limited thereby.

EXAMPLE 1

(a) *2 - bromoandrostan-17β-ol-3-one.*—A solution of 10.0 g. of androstan-17β-ol-3-one in 41 ml. of dry tertiarybutyl alcohol and 140 ml. of glacial acetic acid was cooled to 15–19° C. To this solution there was added with stirring 7 drops of 30% hydrogen bromide in glacial acetic acid followed by 71.5 ml. of bromine in glacial acetic acid (5.51 g. of bromine, 77 mg. of bromine per ml.) added as rapidly as the color disappeared (about ten minutes). The reaction mixture was poured into ice-water, and the product collected by filtration and dissolved in ether. The latter solution was concentrated in vacuo to give 7.17 g. of 2 - bromoandrostan-17β-ol-3-one, M.P. 147–150° C. (decompn.) (uncorr.). One recrystallization from ether gave a sample with the M.P. 153–154° C. (uncorr.).

(b) *17β - hydroxyandrostano[2,3 - d] - 2' - aminothiazole* (I; R is H, R' is H).—A solution of 3.87 g. of 2-bromoandrostan-17β-ol-3-one and 11.5 g. of thiourea in 480 ml. of methyl ethyl ketone was refluxed for 20.5 hours. The reaction mixture was concentrated in vacuo to half its original volume, 400 ml. of water was added, and the remainder of the methyl ethyl ketone was distilled off in vacuo. The solid product, the hydrobromide salt of 17β - hydroxyandrostano[2,3-d]-2'-aminothiazole, was collected by filtration, suspended in water containing a few ml. of concentrated ammonium hydroxide, an equal volume of methylene dichloride added and the whole stirred vigorously until dissolved to remove residual hydrogen bromide. The methylene dichloride was removed in vacuo and the resulting suspension filtered. The solid product was washed with water and recrystallized from methanol using activated charcoal for decolorizing purposes to give 2.05 g. of 17β-hydroxyandrostano[2.3-d]-2'-aminothiazole, M.P. 288.2->300° C. (corr.) when recrystallized three times from methanol and dried for thirteen hours at 115° C. in vacuo; $[\alpha]_D^{25} = +67.8° \pm 0.2°$ (1% in 95% ethanol); ultraviolet maximum at 263 mμ (E=7,000, 95% ethanol).

Analysis.—Calcd. for $C_{20}H_{30}N_2OS$: C, 69.31; H, 8.73; N, 8.09. Found: C, 69.29; H, 8.76; N, 7.92.

The 2-bromoandrostan-17β-ol-3-one in the preceding preparation can be replaced by a molar equivalent amount of 2-chloroandrostan-17β-ol-3-one or 2-iodoandrostan-17β-ol-3-one with the same results.

EXAMPLE 2

17β-hydroxyandrostano[2.3-d]-2'-aminothiazole reacts with an equivalent amount of hydrochloric acid, hydrofluoric acid, hydriodic acid, sulfuric acid, phosphoric acid, ethanesulfonic acid or p-toluenesulfonic acid to give the hydrochloride, hydrofluoride, hydriodide, sulfate (or bisulfate), phosphate (or acid phosphate), ethanesulfonate or p-toluenesulfonate salts, respectively, of 17β-hydroxyandrostano[2.3-d]-2'-aminothiazole. The hydrofluoride salt can be converted to the hydrochloride salt by passing an aqueous solution of the former over an ion-exchange resin saturated with chloride ion.

EXAMPLE 3

*17β-acetoxyandrostano[2.3-d]-2'-aminothiazole* (I; R is H, R' is COCH₃) can be prepared by reacting thiourea with 17β-acetoxy-2-bromoandrostan-3-one (prepared by reacting 17β-acetoxyandrostan-3-one with bromine) according to the manipulative procedure described above in Example 1, part (b).

EXAMPLE 4

*17β - butyryloxyandrostano[2.3-d]-2'-aminothiazole* (I; R is H, R' is COCH₂CH₂CH₃) can be prepared by reacting thiourea with 17β-butyryloxy-2-bromoandrostan-3-one (prepared by reacting 17β-butyryloxyandrostan-3-one with bromine) according to the manipulative procedure described above in Example 1, part (b).

EXAMPLE 5

*17β-benzoyloxyandrostano[2.3-d]-2'-aminothiazole* (I; R is H, R' is COC₆H₅) can be prepared by reacting thiourea with 17β-benzoyloxy-2-bromoandrostan-3-one (prepared by reacting 17β-benzoyloxyandrostan-3-one with bromine) according to the manipulative procedure described above in Example 1, part (b).

EXAMPLE 6

*17β - (β - carboxypropionyloxy)androstano[2.3-d]-2'-aminothiazole* (I; R is H, R' is COCH₂CH₂COOH) can be prepared by reacting thiourea with 17β-(β-carboxypropionyloxy)-2-bromoandrostan-3-one (prepared by reacting 2-bromoandrostan-17β-ol-3-one with succinic anhydride) according to the manipulative procedure described above in Example 1, part (b).

EXAMPLE 7

*17β - cinnamoyloxyandrostano[2.3 - d] - 2' - aminothiazole* (I; R is H, R' is COCH=CHC₆H₅) can be prepared by reacting thiourea with 17β-cinnamoyloxy-2-bromoandrostan-3-one (prepared by reacting -2-bromoandrostan-17β-ol-3-one with cinnamoyl chloride) according to the manipulative procedure described above in Example 1, part (b).

EXAMPLE 8

*17β - (β - cyclopentylpropionyloxy)androstano[2.3-d]-2'-aminothiazole* (I; R is H, R' is COCH₂CH₂C₅H₉) can be prepared by reacting thiourea with 17β-(β-cyclopentylpropionyloxy)-2-bromoandrostan-3-one (prepared by reacting 17β - (β-cyclopentylpropionyloxy)androstan-3-one with bromine) according to the manipulative procedure described above in Example 1, part (b).

EXAMPLE 9

*17β - (p - chlorophenoxyacetoxy)androstano[2.3-d]-2'-aminothiazole* (I; R is H, R' is COCH₂OC₆H₄Cl-p) can be prepared by reacting thiourea with 17β-(p-chlorophenoxyacetoxy)-2-bromoandrostan-3-one (prepared by reacting 17β-(p-chlorophenoxyacetoxy)androstan-3-one with bromine) according to the manipulative procedure described above in Example 1, part (b).

EXAMPLE 10

(a) *2 - bromo - 17α - methylandrostan-17β-ol-3-one* was prepared from 15.2 g. of 17α-methylandrostan-17β-ol-3-one and 8 g. of bromine according to the manipulative procedure described above in Example 1, part (a). There was thus obtained 11.64 g. of 2-bromo-17α-methylandrostan-17β-ol-3-one, M.P. 186–7° C. (uncorr.). One recrystallization from aqueous acetone gave a sample with the M.P. 192–193° C. (uncorr.).

(b) *17β - hydroxy - 17α - methylandrostano[2.3-d]-2'-aminothiazole* (I; R is CH₃, R' is H) was prepared from 5.0 g. of 2-bromo-17α-methylandrostan-17β-ol-3-one and 15.0 g. of thiourea in methyl ethyl ketone solution according to the manipulative procedure described above in Example 1, part (b). The 17β-hydroxy-17α-methylandrostano[2.3-d]-2'-aminothiazole thus obtained had the M.P. 270.2–274.0° C. (corr.) when recrystallized from methanol; $[\alpha]_D^{25} = +47.9° \pm 0.2°$ (1% in ethanol); ultraviolet maximum at 263 mμ (E=7,100).

Analysis.—Calcd. for $C_{21}H_{32}N_2OS$: C, 69.95; H, 8.95; S, 8.89. Found: C, 70.05; H, 9.09; S, 9.00.

EXAMPLE 11

*17β - acetoxy - 17α - methylandrostano[2.3 - d] - 2'-aminothiazole* (I; R is CH₃, R' is COCH₃) can be prepared by reacting thiourea with 17β-acetoxy-17α-methyl-2 - bromoandrostan - 3 - one [prepared by reacting 17β-acetoxy-17α-methylandrostan-3-one, M.P. 152.0–154.2° C. (corr.), $[\alpha]_D^{25} = +20.1° \pm 0.3°$ (1% in chloroform), with bromine] according to the manipulative procedure described above in Example 1, part (b).

EXAMPLE 12

*17β - propionoxy - 17α - methylandrostano[2.3 - d] - 2'-aminothiazole* (I; R is H, R' is COCH₂OC₆H₄Cl-p) can be prepared by reacting thiourea with 17β-propionoxy-17α-methyl - 2 - bromoandrostan-3-one [prepared by reacting 17β-propionoxy-17α-methylandrostan-3-one, M.P. 118.0–125.4° C. (corr.), $[\alpha]_D^{25} = +19.4° \pm 0.2°$ (1% in chloroform), with bromine] according to the manipulative procedure described above in Example 1, part (b).

EXAMPLE 13

*17β - cyclohexylacetoxy-17α-methylandrostano[2.3-d]-2'-aminothiazole* (I; R is CH₃, R' is COCH₂C₆H₁₁) can be prepared by reacting thiourea with 17β-cyclohexylacetoxy-17α-methyl-2-bromoandrostan-3-one [prepared by reacting 17β - cyclohexylacetoxy-17α-methylandrostan-3-one, M.P. 142.6–146.2° C. (corr.), $[\alpha]_D^{25} = +20.6° \pm 0.5°$ (1% in chloroform), with bromine] according to the manipulative procedure described above in Example 1, part (b).

EXAMPLE 14

*17β - (p - bromophenoxyacetoxy) - 17α - methylandrostano[2.3 - d] - 2' - aminothiazole* (I; R is CH₃, R' is COCH₂OC₆H₄Br-p) can be prepared by reacting thiourea with 17β-(p-bromophenoxyacetoxy)-17α-methyl-2-bromoandrostan-3-one [prepared by reacting 17β-phenoxyacetoxy-17α-methylandrostan-3-one, M.P. 147.8–149.8° C. (corr.), $[\alpha]_D^{25} = +23.4°$ (1% in chloroform), with two molar equivalents of bromine] according to the manipulative procedure described above in Example 1, part (b).

EXAMPLE 15

*17β - hydroxy-17α-ethylandrostano[2.3-d]-2'-aminothi-

*azole* (I; R is C₂H₅, R' is H) can be prepared by reacting thiourea with 2-bromo-17α-ethylandrostan-17β-ol-3-one (prepared by reacting 17α-ethylandrostan-17β-ol-3-one with bromine) according to the manipulative procedure described above in Example 1, part (b).

EXAMPLE 16

*17β - hydroxy-17α-isopropylandrostano[2.3-d]-2'-aminothiazole* (I; R is CH(CH₃)₂, R' is H) can be prepared by reacting thiourea with 2-bromo-17α-isopropylandrostan-17β-ol-3-one (prepared by reacting 17α-isopropylandrostan-17β-ol-3-one with bromine) according to the manipulative procedure described above in Example 1, part (b).

EXAMPLE 17

*17β - hydroxy-17α-butylandrostano[2.3-d]-2'-aminothiazole* (I; R is CH₂CH₂CH₂CH₃, R' is H) can be prepared by reacting thiourea with 2-bromo-17α-butylandrostan-17β-ol-3-one (prepared by reacting 17α-butylandrostan-17β-ol-3-one with bromine) according to the manipulative procedure described above in Example 1, part (b).

Pharmacological evaluation has shown that the compounds of the invention possess hypotensive activity, while lacking any appreciable endocrinological activity, and are therefore useful in lowering the blood pressure of mammals. For example, 17β-hydroxyandrostano[2.3-d]-2'-aminothiazole and 17β-hydroxy-17α-methylandrostano[2.3-d]-2'-aminothiazole were found to be effective at a dose level of 20–40 mg./kg. of body weight when administered subcutaneously or orally to rats, without toxic manifestations.

The present invention is also concerned with new therapeutic compositions containing as an essential ingredient a compound of Formula I or a salt thereof in an amount sufficient to impart to said composition hypotensive properties, and a therapeutically acceptable vehicle.

In the foregoing compositions the amount of active steroid ingredient can vary from about one percent to about fifty percent by weight relative to the total weight of the composition. The nature of the therapeutically acceptable vehicle can vary widely, depending upon the intended route of administration. If the composition is to be administered parenterally by injection, the vehicle can be an aqueous solution containing a surfactant or thickening agent in which the steroid in finely divided form produces a stable suspension; or the vehicle can be a mixture of water and a polar, water-miscible organic solvent, such as propylene glycol, in which the steroid forms a true solution. The steroid in acid-addition salt form is more water-soluble than in the free base form. Other ingredients may be present if desired, such as sodium chloride to make the solution isotonic, buffers to control pH, germicidal agents, and so forth. Alternatively, parenterally injectable aqueous suspensions can be prepared by poising the finely divided steroid in an aqueous solution of a water-soluble, non-toxic, highly iodinated organic compound such as is commonly used in urography, said solution having a density approximately the same as that of the suspended solid.

Non-aqueous compositions for intramuscular injection can be prepared by dissolving or suspending the steroid in a therapeutically acceptable oil such as peanut oil, cottonseed oil, olive oil, and the like. Other non-aqueous solvents which can be employed are dimethylformamide, dimethylacetamide, absolute ethanol, and dodecyl alcohol.

If the composition is to be administered orally, the composition can be in aqueous suspension form or in tablet form with conventional solid excipients such as starch, talc, lactose, and the like. Alternatively, the steroid can be dissolved or suspended in a therapeutically acceptable oil and placed in soft gelatin solutions containing about 25 mg. of steroid per capsule.

The ester species of the invention wherein R in Formula I represents an acyl radical are useful in that they function to improve solubility in oily media and modify the duration of activity.

Representative formulations which have been utilized as hypotensive compositions are the following:

(1) For subcutaneous administration: a mixture of 75% propylene glycol and 25% water by volume containing 1 mg. per cc. of 17β-hydroxy-17α-methylandrostano[2.3-d]-2'-aminothiazole.

(2) For oral administration: an aqueous suspension of finely ground 17β-hydroxyandrostano[2.3-d]-2'-aminothiazole in a concentration of 5 mg. per cc., the suspension being stabilized by the addition of a drop of polysorbate 80.

I claim:
1. A member of the group consisting of (A) androstane compounds having the formula

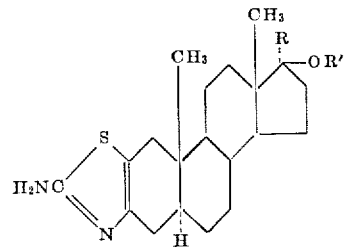

wherein R is selected from the group consisting of hydrogen and lower-alkyl radicals, and R' is selected from the group consisting of hydrogen and carboxylic acyl radicals having from one to about ten carbon atoms and a molecular weight less than about 250; and (B) acid-addition salts thereof.

2. A compound having the formula

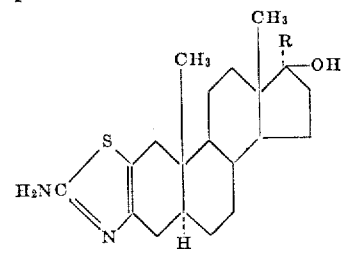

wherein R represents a lower-alkyl radical.

3. 17β-hydroxy-17α-methylandrostano[2.3-d]-2'-aminothiazole.

4. 17β-hydroxyandrostano[2.3-d]-2'-aminothiazole.

5. A therapeutic composition comprising, as an essential ingredient thereof, a member of the group consisting of (A) compounds having the formula

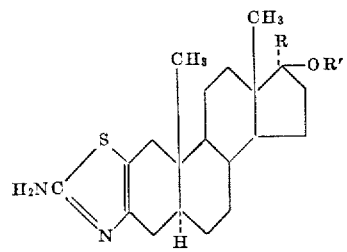

wherein R is selected from the group consisting of hydrogen and lower-alkyl radicals, and R' is selected from the group consisting of hydrogen and carboxylic acyl radicals having from one to about ten carbon atoms and a molecular weight less than about 250; and (B) acid-addition salts thereof, in amount sufficient to impart to said composition hypotensive properties, and a therapeutically acceptable vehicle.

6. A therapeutic composition comprising, as an essential ingredient thereof, 17β-hydroxy-17α-methylandrostano[2.3-d]-2'-aminothiazole in amount sufficient to impart to said composition hypotensive properties, and a therapeutically acceptable vehicle.

7. A therapeutic composition comprising, as an essential ingredient thereof, 17α-hydroxyandrostano[2.3-d]-2'-aminothiazole in amount sufficient to impart to said composition hypotensive properties, and a therapeutically acceptable vehicle.

References Cited in the file of this patent

UNITED STATES PATENTS 2,813,859    Korman _____ Nov. 19, 1957

UNITED STATES PATENT OFFICE
CERTIFICATE OF CORRECTION

Patent No. 3,081,228　　　　　　　　　　　　　　　　March 12, 1963

Raymond O. Clinton

It is hereby certified that error appears in the above numbered patent requiring correction and that the said Letters Patent should read as corrected below.

Column 1, line 51, for "thioure" read -- thiourea --; column 4, line 44, for "(I;R is H, R' is $COCH_2OC_6H_4Cl-p$)" read -- (I;R is $CH_3$, R' is $COCH_2CH_3$) --; column 7, line 5, for "17α-hydroxyandrostano[2.3-" read -- 17β-hydroxyandrostano[2.3- --.

Signed and sealed this 24th day of December 1963.

EAL)
:est:
NEST W. SWIDER esting Officer

EDWIN L. REYNOLDS

Acting Commissioner of Patents